April 28, 1970 L. SEIDL 3,508,298
INJECTION MOLDING APPARATUS PROVIDED WITH A
COOPERATING PLASTICIZING MATERIAL
FEED DEVICE
Filed Oct. 9, 1967 2 Sheets-Sheet 1

INVENTOR
LUDWIG SEIDL
By Silverman & Cass
Attorneys

April 28, 1970 L. SEIDL 3,508,298
INJECTION MOLDING APPARATUS PROVIDED WITH A
COOPERATING PLASTICIZING MATERIAL
FEED DEVICE
Filed Oct. 9, 1967 2 Sheets-Sheet 2

INVENTOR
LUDWIG SEIDL
By Silverman & Cass
Attorneys

United States Patent Office 3,508,298
Patented Apr. 28, 1970

3,508,298
INJECTION MOLDING APPARATUS PROVIDED WITH A COOPERATING PLASTICIZING MATERIAL FEED DEVICE
Ludwig Seidl, Munich, Germany, assignor to Firma Georg Seidl, Munich, Germany
Filed Oct. 9, 1967, Ser. No. 673,612
Claims priority, application Germany, Oct. 7, 1966, S 106,398
Int. Cl. B29f 1/08
U.S. Cl. 18—30                                12 Claims

ABSTRACT OF THE DISCLOSURE

An injection molding apparatus of the type in which a piston moves a mass of material along a main injection cylinder provided wtih an internal plasticizing torpedo or capsule adjacent the nozzle, said capsule being constructed with constricted passageways so that the plastic material must be forced therethrough, thereby thoroughly mixing the material and raising its temperature by friction to assist in plasticizing the same prior to discharge thereof. There is a material supply or feed device connected for discharging such material into said injection cylinder upstream of said capsule, said device having a cylinder and piston movable therein and an internal plasticizing capsule adjacent said point of discharge operable to supply material to said injection cylinder as an amorphous or plastic mass for passage additionally through the capsule in the injection cylinder prior to discharge thereof from said nozzle. Thus the action of the capsules augment one another. The manner of assembly of said material feed device to and its operating position relative to the main injection cylinder provide for modified embodiments of the invention.

BACKGROUND OF THE INVENTION

This invention relates generally to injection molding apparatus and more particularly is concerned with such apparatus having an internal capsule in the injection cylinder through which the plastic material is forced during molding for homogenizing and heating the material and a plastic material supply or feed device connected to supply heated plastic material to the injection cylinder upstream of the capsule in said injection cylinder so that the plastic material is discharged from the injection cylinder into a mold after it has been passed through an internal capsule both in the supply of feed device and the injection cylinder.

The injection molding machine is well known and generally comprises an injection cylinder within which a reciprocating piston is arranged to force the material which is to be injected into a mold through a nozzle prior to feeding into the mold. The material normally is introduced into the injection cylinder by means of a material feed or supply device in powder, piece or granular form, and as the piston moves forward, it is desirable to increase the temperature of the material and thoroughly mix the same so that a homogenous plastic mass is available at the injection cylinder nozzle.

Such injection molding machines have been known to effect the mixing and heating of the plastic mass moved forward by the piston, at least in part, by means of baffle devices installed in the injection cylinder between the piston and the nozzle. One known device of this kind consisted of a torpedo or capsule in the form of a plurality of small axial holes formed therein, thus requiring the mass to be compressed and extruded through the axial holes. Such prior capsules are disadvantageous to the extent that they are expensive to manufacture, difficult to maintain clean and operative by reason of clogging of said holes and inability of said holes to assure sufficient frictional heat upon passage of the material therethrough to plasticize many plastic materials. As a result, additional heating means in some instances were required with accompanying increase in cost of manufacturing.

Another form of capsule in the injection cylinder which circumvents the disadvantages of the capsule device described in the immediately preceding paragraph is described and illustrated in co-pending application of George Nusstein, Ser. No. 636,715, filed May 8, 1967, and owned by the same assignee as this patent application. The torpedo or capsule of said co-pending application utilized a novel arrangement of balls retained in the capsule to provide a particularly advantageous arrangement of radial and axially oriented interstices between contacting balls through which the plastic material was moved in a tortuous path to assure raising of the temperature of the plastic material.

It is also known to employ a worm feed device in injection molding machines for rubber which in addition to its ordinary rotary motion can be translated axially. The worm feed achieves the desired plasticizing of the material during its rotary and axial movement whereby to raise the temperature of the rubber. As the rubber is ejected through the nozzle of the injection cylinder, the temperature thereof is elevated additionally. Since the time period of vulcanization in the normally heated mold is desired to be as short as possible, the temperature of the discharged rubber is desired to be substantially elevated however, not so elevated beyond its vulcanizing temperature prior to discharge from the injection cylinder. Because of non-uniform heating within the injection cylinder, it frequently occurs that the ejected rubber is at different or non-uniform temperatures. This may be attributed to axial displacement of the worm in the injection cylinder causing different axial lengths of the worm to engage specific parts of the rubber material. Thus, the rubber material initially moved along by the worm feed will be elevated to a higher temperature than the rubber material moved along the worm at the end of the feeding cycle because only a smaller axial portion of the worm is effective at this latter location. Consequently, the worm-type feed is not capable of elevating the temperature of the rubber material to at least approximately the desired maximum injection temperature for discharge of the rubber material from the injection cylinder nozzle.

In the case of injection molding machines for thermoplastic polymers, recourse is to the piston inside the injection cylinder for feeding or moving the plastic material to the discharge nozzle. In order to obtain plasticizing of the material, there is inserted a torpedo or capsule ahead of the nozzle in a well-known manner which also functions as a spreader of the plastic material so as to distribute the heat of the heated injection cylinder uniformly to the polymer which is, itself, a relatively poor heat conductor. In this usage, it is not intended that the capsule or torpedo elevate the temperature of the polymer a substantial amount. To achieve greater temperature increases in the plastic material, it has been necessary to increase pressure exertible by the piston thereby having recourse to more expensive piston driving apparatus. Thus to obtain relatively high temperatures for the plasticizing of certain materials, it has been necessary to use more expensive and complicated injection cylinder equipment which has materially increased the cost of manufacture and concomitantly, the cost of the molded products.

SUMMARY OF THE INVENTION

The invention is directed to solving the problems mentioned above and hence, the principal object of the invention is to provide an injection molding apparatus which can achieve the desired elevated temperatures of the plastic material ejected from the injection cylinder nozzle more economically and more efficiently than prior apparatus of this type. An ancillary achievement of the invention is elevation of the injected molding material to the desired elevated maximum temperature by means of friction heat created through judicious use of capsules or torpedoes without necessitating more powerful feed or piston drive means.

The invention provides an injection molding machine having a material feed or supply device operatively associated therewith, said feed device including a cylinder and piston movable therein and having a torpedo or capsule positioned ahead of the discharge opening or nozzle thereof, said material being forced through a capsule in the feed device with resulting high efficiency plasticizing of material prior to its discharge into the internal cavity of the main injection cylinder, the so-fed material thereafter being expressed through the capsule or torpedo in said injection cylinder prior to discharge from the nozzle into the mold so that the temperature of the discharged plastic material is elevated further. This multiple expression through capsules results in greater elevation to temperature of the plastic material so that it can be discharged from the nozzle into the mold at the desired elevated temperature without restorting to increased drive power for moving the pistons.

Another object or the invention is to provide an injection molding apparatus of the character described in which the torpedoes or capsules employed in the material feed cylinder and in the injection cylinder are of the ball-type construction described and claimed in said co-pending application.

Another object of the invention is to provide a material supply or feed device of the character described which can be installed in operable association with the main injection cylinder of the machine in a position axially transverse to the axis of the injection cylinder. In another embodiment of the invention aforesaid, said material feed device is capable of being installed coaxially arranged with said injection cylinder.

Further objects of the invention are to provide a material feed device of the character described which can be employed in an injection molding machine economically and efficiently; which feed device incorporates readily removable capsules or torpedoes for suitable servicing.

Another object of the invention is to provide a material feed device which can be cooperatively installed in an injection molding machine for elevating the temperature of the plastic material prior to discharge thereof by said device into the main ejection cylinder of the machine so that the temperature of the plastic material can be further elevated on expression thereof through a torpedo or capsule provided in the injection cylinder.

Many other advantages and objects of the invention will occur to those skilled in the art from the ensuing disclosure in which preferred embodiments of the invention are described in detail and illustrated in the accompanying drawing. It is contemplated that minor variations in structural features and relative arrangement of parts may occur to the skilled artisan without departing from the scope or sacrificing any of the advantages of the invention.

DESCRIPTION OF THE INVENTION

DESCRIPTION OF THE PREFERRED EMBODIMENT

Figure 1:
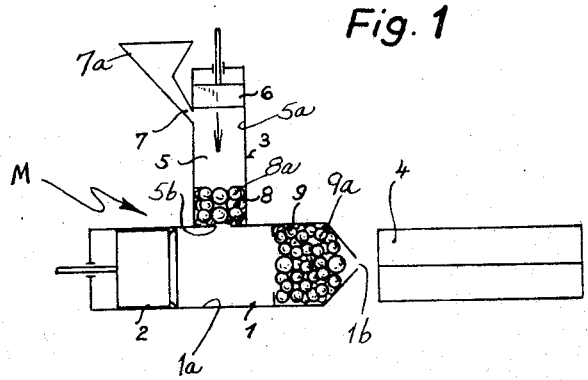
FIG. 1 is a median diagrammatical sectional view taken through a portion of an injection molding machine having the material supply or feed device of the invention operatively associated therewith, said view being generally schematic in nature.
Figure 2:
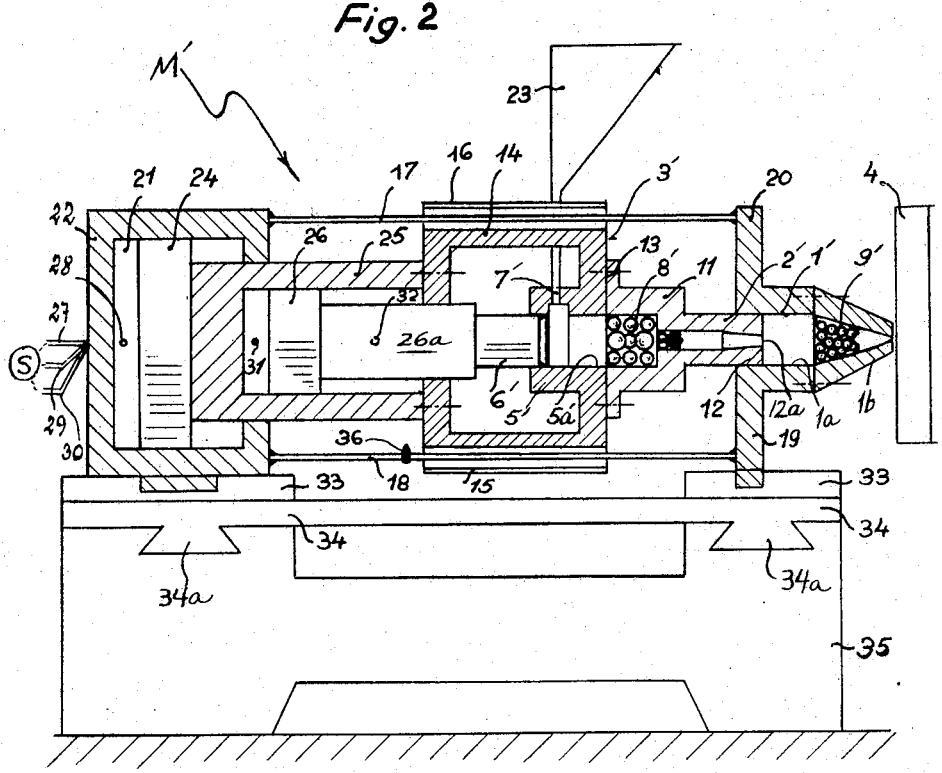
FIG. 2 is a median sectional view of a generally schematic nature taken through a portion of an injection molding machine having a modified form of the invention operatively associated therewith.

In describing the structural features of the invention illustrated in FIGS. 1 and 2, the same primary reference characters will be employed to identify like or equivalent parts throughout the several views and primed reference characters will be employed also to distinguish like or equivalent parts in the several embodiments illustrated.

Referring to FIG. 1, the injection molding machine has been designated generally by the reference character M. The material feed device in one form of the invention has been designated generally by the reference character 3. The machine M will be suitably mounted on a pedestal or support which has not been shown for purposes of clarity. Primarily, the machine M includes a heatable injection cylinder 1 having an internal chamber 1a with the piston 2 movable in said cylinder for ejecting the plastic material into the mold 4. The cylinder 1 and the mold 4 are intended to be movable one relative to the other by means of any one of several different arrangements. For instance, molds 4 may be arranged on a revolving table or platform movable about the cylinder 1, or the cylinder may be mounted for axial movement or angular displacement relative to the molds.

The material feed device 3 seen in FIG. 1 includes a heatable cylinder 5 having an internal chamber 5a, a piston or plunger 6 which is movable axially in the cylinder chamber 5a toward the opening 5b in the discharge end of the cylinder communicating with the internal chamber 1a through the circumferential wall of injection cylinder 1. Adjacent said opening 5b is a capsule or torpedo designated generally 8 which employs a plurality of spherical bodies or balls 8 coacting to provide axial and radial interstices through which the material can be expressed through opening 5b into the chamber 1a. Said capsule 8 is constructed in accordance with the capsule described and illustrated in said co-pending application.

A funnel part 7a is supported on said cylinder 5 and is provided with a discharge passageway 7 into the chamber 5a downstream of the piston 6. The device 3 is fixedly secured to the cylinder 1 by any suitable means not deemed necessary to show in detail for purposes of teaching the invention. Here, device 3 has its axis transverse to the axis of cylinder 1.

The injection cylinder 1a likewise has a torpedo or capsule 9 installed adjacent the discharge nozzle end 1b of the cylinder. The capsule 9 is constructed of a plurality of spherical bodies or balls 9a maintained interengaged to provide axial and radial interstices in the manner of the capsule of said co-pending application. The capsules 8 and 9 are so mounted in the cylinders 1 and 5 respectively that they can be removed for cleaning and servicing purposes in accordance with the disclosure of said co-pending application.

The machine M is operated as follows: Molding material in the form of powder, granules or pieces is fed into the funnel part 7a for discharge through passageway 7 into the chamber 5a of cylinder 5. The piston 6 is activated through suitable means not illustrated for movement in the direction of the arrow toward the discharge opening 5b. As the piston 6 moves toward the capsule 8, mixing and heating of the mass is achieved by forcing the mass to be compressed and extruded through the interstices or restricted passageways in the capsule, thereby raising the temperature thereof by reason of the frictional engagement of the material passing with the surfaces forming said axial and radial interstices or passageways of the capsule. The material is thereafter discharged into cylinder 1 through the discharge opening 5b at an elevated temperature condition and in a partially plasticized mass.

The piston 2 in the cylinder thereafter is moved to the right by suitable means not shown, further compressing and extruding the plastic mass through the torpedo or capsule 9 for ejection out of the discharge opening 1b into the mold 4. In this manner, the plastic material receives additional and improved plasticizing and is elevated in temperature further which may be desired for certain types of extruded materials. If desired, a number of different materials can be processed and mixed simultaneously in the chamber 1a so that a more uniform mass is obtained for discharge from the cylinder 1.

Although the capsules 8 and 9 preferably are of the spherical body or ball-filled type as described and illustrated in said co-pending application, other capsule devices may be used in lieu thereof.

Referring to FIG. 2, a modified form of injection molding device designated M' is illustrated in which the main injection cylinder and the cylinder of the supply feed device are substantially coaxially arranged or one behind the other. The main injection cylinder is designated 1' and is provided with an internal chamber 1a' open at opposite ends thereof. The discharge end of the cylinder 1' has a discharge nozzle 1b' in which is operatively installed the capsule 9'. Movable in the chamber 1a is a piston or plunger 2' of hollow formation. The plunger 2' has a discharge opening or nozzle 12a communicating with the chamber 1a. As seen in FIG. 2, the discharge opening 12a is provided in the forward end portion 12 of the piston or plunger 2'. At its opposite end, the plunger 2' has an enlarged hollow cylindrical formation 11 having a capsule 8' and provided with a peripheral flange 13 which is fixably secured to the intermediary hollow body formation 14.

The intermediary body 14 has upper and lower guide recesses or track formations 15 and 16, respectively, which enabled the body 14 to be linearly reciprocated on the guide rods 17 and 18 respectively engaged through said guide recesses or formations 15 and 16. The guide rods 17 and 18 are fixedly secured at one of their ends to the flange 19–20 formed on the cylinder 1'. The guide rods 17 and 18 are attached at their opposite ends to the hollow body 22 having a cylindrical chamber 21 therein.

The intermediary body 14 has a material feed plunger or piston 6' movable in the cylindrical chamber 5a' of the open-ended cylinder formation 5' in body 14. Connecting with the chamber 5a' is a funnel part 23 having a feed passageway 7' through formation 5' into chamber 5a'. The intermediary body 14 further is connected to the cylindrical hollow formation 25 of the piston 24 movable in the chamber 21. The cylindrical formation 25 has an operating piston 26 movable therein including a piston part 26a engaging with the piston or plunger 6'.

Means for controlling actuation of the various pistons or plungers of the machine M' is provided by a plurality of hydraulic fluid or airline 27, 29 and 30 connected to a suitable source S of fluid which has not been shown in detail. The piston 24 is moved to the right only in FIG. 2 by means of a pressure fluid flowed through line 27 into the chamber 21 through opening 28. The piston 26 is actuated by means of pressure fluid flowed through the lines 29 and 30 connecting with the openings 31 and 32 on opposite sides of the piston head 26.

As seen in FIG. 2, the intermediary body 14 is slidable on the guide rods 17 and 18 between the interconnected parts 20 and 22 which cooperate to form a cylinder unit. The thusly connected member 22 and the member 20 are supported in a guide formation 33 which is reciprocable axially, i.e., in the direction of the axes of the aligned cylinders. The guide 23 further is slidably supported on a guide 34 having a dovetail joint 34a with the base or pedestal 35 so that guide 34 can move linearly in a direction perpendicular to the direction of linear movement of the axial guide 33. Both guides 33 and 34 are to be considered supported on the pedestal 35.

The machine M' operates as follows: The raw material in granular, powder or pellet form is fed from the funnel 23 through the feed passageway 7' into the chamber 5a' of the heatable cylinder 5'. The piston 26 thereafter is caused to move reciprocably in the cylinder 25 causing reciprocal movement of the piston part 26a and the piston 6' in a plurality of material feeding and strokes. The plastic is softened and heated as it is forced through the capsule 8' into the hollow piston part 2' and through the discharge opening 12a into the chamber 1a of the injection cylinder 1. As the chamber 1a continues to be filled with the mixed, warmed and plasticized mass of material from the discharge opening 12a, the piston part 2' is moved by the mass of material to the left carrying with it the intermediary body 14. When the chamber 1a is filled to its capacity, the body 14 will have been moved to the left so that the guide 15 will abut the adjustable stop formation 36 thereby halting the movement of the plunger 26. At this posture of the plunger 26, the supply of plasticized material to the chamber 1a is halted. Concurrently, pressure fluid is applied from passageway 27 into the chamber 21 through opening 28 to impinge against the plunger 24. The plunger 24 and cylinder 26 are moved to the right carrying with them the intermediary body 14 and the cylindrical part 11 connected to the hollow piston 2'. The plunger or piston 2 accordingly will likewise be moved to the right or towards the mold 4 to compress the material in chamber 1a and force the same through the capsule 9' to be ejected into the mold.

After the injection process is completed, the supply of fluid pressure medium to the main cylinder 21 is halted. The operating cylinder 26 of the feed device commences again to reciprocate and press new material which has been injected into the chamber 5a' past the capsule 8' into the chamber 1a' of cylinder 1'. The cycle of operation is repeated automatically to provide discharge of a complete load from the cylinder chamber 1a' into a suitable mold which is brought up for this purpose.

Although not shown, automatic control equipment or a programming device can be provided for sequentially delivering a new mold to its station at the discharge nozzle of the injection cylinder 1' for receiving a charge of plasticized material. In view of the cooperating action of the capsules 8' and 9', more advantageous plasticizing and heating of the materials is achieved. This arrangement of cooperating capsules provides for more efficient operation of the molding machine and one which can use the same driving power for the machine as in previous devices without recourse to more powerful piston driving apparatus.

The injection molding machine embodying the invention is especially suitable for processing rubber. However, this molding machine may also be used for processing thermoplastic polymers where lower heating requirements for the cylinders may be realized by judicious use of proper capsule or torpedo constructions. Better heat or temperature control of the polymer inside of cylinder is achieved so as to avoid burning or crust formations inside the cylinder which hamper proper use of the machine. Yet, the machine assures that the plasticized material will be raised to a sufficiently high temperature so as to reduce the viscosity thereof for proper ejection from the nozzle of the injection cylinders.

Although not specifically shown, it will be appreciated that the piston or plunger 2 or 2' can be provided with suitable annular sealing rings or lips which cooperate with the cylindrical wall of chambers 1a or 1a' in pressing the plastic material toward the capsule. The sealing ring or lip would contact the internal cylindrical wall and in a scraper action prevent the formation of vulcanizing or setting of the material so that the piston would size or bind in the cylinder.

It is believed that the invention has been described in adequate detail to enable the skilled artisan to understand and practice the same. It is intended that the language of the claims hereto appended be liberally construed commensurate with the progress in the arts and sciences contributed by the invention particularly pointed out therein.

It is claimed:

1. An injecting molding apparatus comprising, in combination:
    (a) an injection cylinder having a discharge nozzle at one end thereof and a piston reciprocal axially in said cylinder to force plastic materials to be discharged from the nozzle;
    (b) capsule means installed in said cylinder adjacent said nozzle for extruding the materials prior to discharge from said nozzle;
    (c) plastic material feed or supply means associated with said injection cylinder comprising,
        (i) a second cylinder having a reciprocating plunger therein and a discharge opening into said injection cylinder at a location between said capsule and piston,
        (ii) and a second capsule means in said second cylinder between the discharge opening and said plunger,
    (d) said capsules being separately operable for elevating the temperature of the material discharged from nozzle to a desired level.

2. The combination described in claim 1 in which each of said capsules has a plurality of spherical bodies engaged therein to provide axial and radial interstices for extrusion of said materials therethrough.

3. The combination described in claim 1 in which said feed means and the injection cylinder have their axes transverse one relative to the other.

4. The combination described in claim 1 in which the feed means and injection cylinder have their axes aligned substantially coaxially.

5. The combination described in claim 4 in which said piston is hollow and open-ended, said second capsule being located in said piston adjacent one open end thereof, said adjacent one-end opening into the injection cylinder, said plunger being reciprocable in said piston through the second open end thereof.

6. The combination described in claim 4 in which said piston is hollow and has said plunger reciprocable therein for feeding material to the injection cylinder.

7. The combination described in claim 6 in which fluid pressure means are connected with said injection cylinder to supply pressure fluid on opposite sides of said piston for reciprocating same.

8. The combination described in claim 7 in which automatic stop means are engageable with said piston for stopping reciprocation thereof when said injection cylinder is loaded with material to a predetermined level.

9. The combination of claim 1 in which said second cylinder has a funnel means communicatively connected therewith.

10. A plastic material feed device adapted to be operably connected with the injection cylinder of an injection molding machine comprising, a cylinder having a reciprocating piston mounted for axial movement therein, said cylinder having a discharge opening at one end therein, and capsule means secured on the interior of the feed device cylinder adjacent said opening.

11. The device described in claim 10 in which there is a funnel secured on said cylinder in communication with the interior of the cylinder between the piston and capsule means.

12. The device described in claim 11 in which said capsule means has a plurality of spherical bodies for extruding plastic material therethrough prior to discharge thereof through said opening.

References Cited

UNITED STATES PATENTS 3,130,452   4/1964   Heumann.

FOREIGN PATENTS 1,016,815   11/1952   France.
218,232   11/1961   Austria.
1,105,153   4/1961   Germany.

WILBUR L. McBAY, Primary Examiner